United States Patent [19]

Eichenseher et al.

[11] 4,018,058

[45] Apr. 19, 1977

[54] METHOD OF RECOVERING NON-FERROUS METAL CONDUCTORS FROM A TELECOMMUNICATION CABLE LAID IN THE EARTH

[76] Inventors: Heinrich Eichenseher; Wolfgang Eichenseher, both of 721 Rottweil 1, Bohringer-Steige 3/1, Germany

[22] Filed: Jan. 14, 1976

[21] Appl. No.: 649,163

[30] Foreign Application Priority Data

Jan. 17, 1975 Germany .................. 2501656

[52] U.S. Cl. .................. 61/105; 29/427; 81/9.51; 174/37
[51] Int. Cl.² .................. F16L 1/00
[58] Field of Search .................. 61/72.1; 81/9.51; 29/427; 174/37

[56] References Cited

UNITED STATES PATENTS

| 2,731,738 | 1/1956 | Kossa | 61/72.1 X |
| 3,675,315 | 7/1972 | Zebe | 29/427 |

FOREIGN PATENTS OR APPLICATIONS

| 1,515,956 | 12/1969 | Germany | 61/72.1 |

*Primary Examiner*—Jacob Shapiro
*Attorney, Agent, or Firm*—Irvin A. Lavine

[57] ABSTRACT

A method of recovering non-ferrous metal conductors from a sheathed cable laid in the earth comprising excavating the earth at spaced intervals, such as 20 to 50 meters, along the cable, severing the cable, stripping off the sheath to expose the conductors adjacent the severed end or ends, and withdrawing the severed conductor length by supplying a pulling force to a severed end.

6 Claims, 3 Drawing Figures

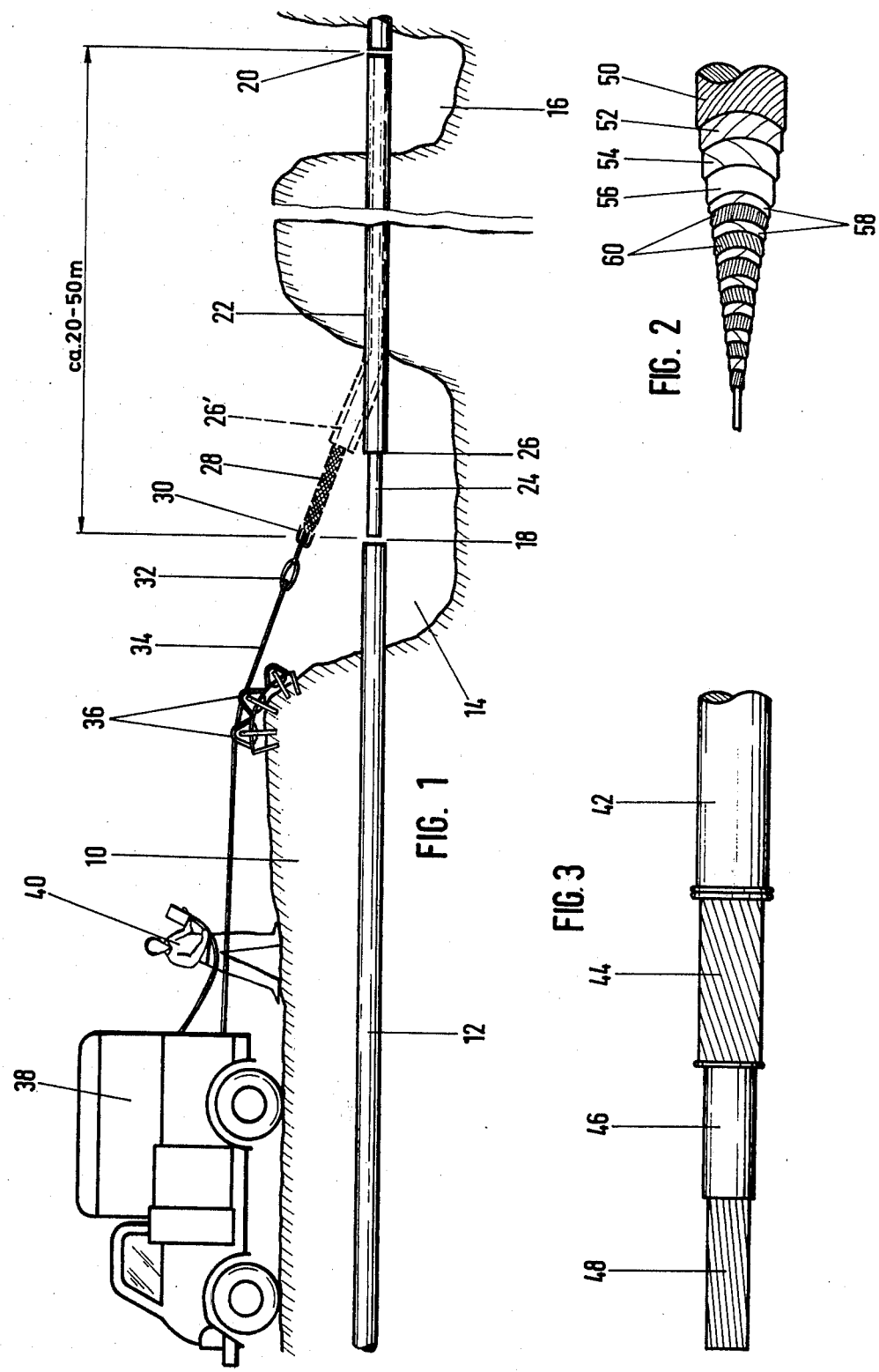

METHOD OF RECOVERING NON-FERROUS METAL CONDUCTORS FROM A TELECOMMUNICATION CABLE LAID IN THE EARTH

The invention relates to a method of recovering paper-sheathed non-ferrous metal conductors from a telecommunication cable laid in the earth.

In the field of telecommunication systems the problem often occurs of replacing old telecommunication cables by new cables. Previous calculations have shown that as a general rule it is more economical to leave the old cable in the ground, since the cost entailed by earth-moving work for exposing and extracting these cables exceeds the saving that can be made by extracting the non-ferrous conductors, for example copper conductors.

The problem underlying the invention is that of providing a profitable method of recovering non-ferrous metal conductors from telecommunication cables laid in the earth.

According to the invention the foregoing problem is solved by excavating to expose and cut through the cable at short intervals of about 20 to 50 meters, stripping off the sheath to expose the non-ferrous metal conductors at one end of each length of the cut off cable and passing the exposed ends of the non-ferrous metal conductors through a cable grip and bending them over, whereupon the length of conductor can be pulled out of each portion of cable with the aid of the cable grip.

When the method of the invention is applied it is no longer necessary for the cables to be dug out completely in order to remove the non-ferrous metal conductors, but the excavation work is reduced to a fraction because only a short length of cable has to be exposed at fairly long intervals. In the case of telephone cables whose copper conductors are introduced into the sheath in a stratified arrangement with opposite directions of lay in each individual layer, the conductors can be pulled out particularly easily because when a pull is applied to one end the individual layers are stretched and thus their cross-section is slightly reduced.

The intervals at which excavation is necessary depend on the type of cable laid in the ground. In some cables the copper conductors can be pulled out only with very great difficulty, so that the intervals must be reduced to about 20 meters. In other cases the distance between the individual excavation points can be increased to about 50 meters or more. If it is reckoned that a length of about 1 to 2 meters of cable is exposed at each excavation, in the most unfavourable case there is a reduction of excavation work to about 5 to 10% as compared with complete digging-out of a cable laid in the earth. In the case of non-ferrous metal conductors which can be pulled out more easily and where thus the excavation points are more widely spaced, this percentage is reduced considerably more.

Since the sheathing if the non-ferrous metal conductors in an underground cable contains no particularly valuable material, the sheathing is left in the ground in the case of the method of the invention.

The use of a cable grip known per se provides the advantage that when a pull is applied it tightens and firmly grips the cable held by it, so that a firm pulling connection is made between the cable grip and the ends of the conductors.

It is expedient for this cable grip to be pulled with the aid of a rope fastened to it.

In order in this case to keep the friction between the rope and the ground as low as possible, as a further development of the invention the rope is guided over rope rollers anchored in the ground at the top edge (in the direction of extraction) of the respective excavation.

One embodiment of the method of the invention is illustrated in the drawings, in which;

FIG. 1 is a vertical section through the ground and with parts in elevation illustrating diagrammatically one form of the method, FIG. 2 shows a partly stripped end of a first type of cable, on a larger scale, and FIG. 3 shows a corresponding end of a second type of cable.

DESCRIPTION OF THE PREFERRED EMBODIMENT

As shown in FIG. 1, the method of the invention is applied to a telecommunication cable 12 laid in the ground 10. By excavating at two points 14 and 15 spaced about 20 to 50 meters apart short lengths of cable of about 1 to 2 meters are exposed at each excavation point. The cable is then cut through or served at the respective points 18 and 20, whereupon the cut length of cable 22 is stripped of its sheath at the end lying at the excavation point 14, so that the nonferrous metal conductors 24 project slightly from the cable sheath 26. The portion of the cable projecting out of the earth is then bent slightly upwards into the postion 26' shown in dashed lines and the stripped ends of the conductors 24 are guided through a cable grip 28 known per se and bent over outwards at the front end of the grip so as to form a crown 30 of conductor ends. The front end of the cable grip 28 is provided with a cable thimble 32, to which a rope 34 is attached. The rope 34 is guided over cable rollers 36 anchored in the ground 10 to a rope winch (not shown) mounted on a motor vehicle 38. The rope winch is operated by an operator 40, likewise in a manner known per se and not illustrated.

When the rope winch is operated the cable grip 28 first tightly grips the end or ends of the non-ferrous metal conductor or. The latter is/are are thereupon pulled out of the sheath of the length of cable 22 cut off.

FIG. 2 shows the construction of a telecommunication cable (subscribers' cable type). This type of cable consists of a jute wrapping 42, armouring 44 of steel strip or the like, and a lead sheath 46 enclosed in these two layers. These three layers constitute the sheathing of the non-ferrous metal conductor 48 which is actually of interest here, for example copper conductors or the like. The method of the invention is intended to permit the recovery of the conductors 48 only.

FIG. 3 illustrates diagrammatically the end of a telecommunication cable (exchange cable type). The outermost covering 50 here also consists of jute, and in the inward direction there follow steel strip armouring 52, an insulating wrapping 54 of impegnated paper, and a lead sheath 56. Within the sheath 56 are disposed a number of layers 60 of non-ferrous metal conductors, which layers are insulated against one another by layers of paper 58 and are wound with a twist. In this exaple and in that described above each individual non-ferrous conductor is obviously also individually insulated, usually by means of paper.

If the underground cable shown in FIG. 3 is stripped of its sheathing by removing the layers 50 to 56 at the end, the layers 60 nesting in one another together with the paper insulations 58 can be gripped by a cable grip 28 in the manner shown in FIG. 1, and can be pulled out particularly easily since in consequence of the winding twist of the layer of conductors the cross-section of all the layers is reduced, so that they slip easily out of the lead sheath 56. To a certain extent this also applies to the cable shown in FIG. 2, where however only a unitary volume of non-ferrous metal conductors is provided and the twist of this volume is likewise usually only slight. Nevertheless, here again there is frequently a reduction of cross-section, so that the extraction of the conductors is not too difficult.

We claim:

1. A method of recovering non-ferrous metal conductors from a sheathed cable laid in the ground comprising;
    a. excavating the earth so as to expose a short length of the cable,
    b. cutting through the cable at the excavation and at a location spaced from the excavation, to thereby provide a severed length of the cable,
    c. stripping the sheath from the end of the severed length of the cable in the excavation to expose the conductors at the end of the severed length, and
    d. withdrawing the cable conductor by pulling on the thus stripped end of the conductor of the severed cable.

2. The method of claim 1, wherein after step (c) the exposed conductors are passed through a cable grip, and the cable conductor is withdrawn by pulling on the cable grip.

3. The method of claim 2, wherein following the passing of the exposed conductor through the cable grip, the ends of the conductor are bent over.

4. The method of claim 3, and further comprising attaching a rope to said cable grip, and pulling on said rope by a winch.

5. The method of claim 4, and further comprising passing said rope over anti-friction means at the edge of the excavation.

6. The method of claim 1, wherein the earth is excavated at a distance from said excavation, and the cable is cut through at both said excavations.

* * * * *